US011275706B2

(12) United States Patent
Ito

(10) Patent No.: US 11,275,706 B2
(45) Date of Patent: Mar. 15, 2022

(54) STORAGE SYSTEM HAVING MULTIPLE BRIDGES CORRESPONDING TO MULTIPLE OPERATION MODES AND CONTROL METHOD THEREFOR

(71) Applicant: CANON KABUSHIKI KAISHA, Tokyo (JP)

(72) Inventor: Hiroki Ito, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 458 days.

(21) Appl. No.: 16/176,563

(22) Filed: Oct. 31, 2018

(65) Prior Publication Data
US 2019/0138480 A1    May 9, 2019

(30) Foreign Application Priority Data

Nov. 6, 2017    (JP) .............................. JP2017-213822

(51) Int. Cl.
*G06F 13/40*    (2006.01)
*G06F 12/14*    (2006.01)

(52) U.S. Cl.
CPC ...... *G06F 13/4027* (2013.01); *G06F 12/1408* (2013.01); *G06F 2212/1052* (2013.01)

(58) Field of Classification Search
CPC ............. G06F 13/4027; G06F 12/1408; G06F 2212/1052; G06F 21/78; G06F 21/6209; G06F 3/0623; G06F 3/0632; G06F 3/0617; G06F 3/068; G06F 3/0634; G06F 3/0689; G06F 3/065; G06F 13/1668; G06F 2213/0032
USPC ........................................................ 713/193
See application file for complete search history.

(56) References Cited

U.S. PATENT DOCUMENTS

| 2008/0279382 | A1* | 11/2008 | Chen ....................... G06F 21/79 380/277 |
| 2013/0159608 | A1* | 6/2013 | Shin ....................... G06F 3/0607 711/103 |
| 2014/0006729 | A1* | 1/2014 | Cox ....................... G06F 13/161 711/154 |
| 2016/0284415 | A1* | 9/2016 | Park ...................... G11C 16/0483 |

FOREIGN PATENT DOCUMENTS

| JP | 10-143328 A | 5/1998 |
| JP | 2011-515749 A | 5/2011 |

* cited by examiner

*Primary Examiner* — Farid Homayounmehr
*Assistant Examiner* — Sanchit K Sarker
(74) *Attorney, Agent, or Firm* — Canon U.S.A., Inc. IP Division

(57) ABSTRACT

According to an aspect of the present disclosure, SATA bridges in cascade connection and storage devices connected beyond the SATA bridges are identified. A setting of the operation mode of each of the SATA bridges is performed in accordance with a connection configuration of the SATA bridge and the storage device.

19 Claims, 10 Drawing Sheets

FIG. 7A

| Settable Operation Mode Pattern | Cascade Connection Configuration Pattern | | |
|---|---|---|---|
| | Only Storage Device | SATA Bridge ×1 Only | SATA Bridges ×2 or More |
| | — | Mirroring Mode Only | Mirroring Mode Only |
| | | Hybrid Mode Only | Hybrid Mode Only |
| | | — | Both Mirroring Mode and Hybrid Mode |

FIG. 7B

| Operation Mode Allocation | Cascade Connection Configuration Pattern | | |
|---|---|---|---|
| | Storage Device ×1 SATA Bridge ×1 | SATA Bridges ×2 or More | |
| Operation Mode of Its Own Device (SATA Bridge 200) | Hybrid Mode + With Encryption | Hybrid Mode + With Encryption | Mirroring Mode + With Encryption |
| Operation Mode of First Lower-Level Bridge Device (SATA Bridge 300) | Mirroring Mode (Without Encryption) | Mirroring Mode (Without Encryption) | Hybrid Mode (Without Encryption) |
| Operation Mode of Second Lower-Level Bridge Device (SATA Bridge 310) | — | Mirroring Mode (Without Encryption) | Hybrid Mode (Without Encryption) |

STORAGE SYSTEM HAVING MULTIPLE BRIDGES CORRESPONDING TO MULTIPLE OPERATION MODES AND CONTROL METHOD THEREFOR

BACKGROUND OF THE INVENTION

Field of the Invention

One disclosed aspect of the embodiments relates to a storage system and a control method for the storage system.

Description of the Related Art

An information processing apparatus such as a multi function printer (MFP) saves a program of the apparatus and image data of a user. For this purpose, the MFP is provided with a storage device such as a hard disk drive (HDD) or a solid state drive (SSD).

Up to now, a control method for a storage system using Serial Advanced Technology Attachment (SATA) corresponding to an interface standard of the storage device or the like has been proposed.

For example, according to Japanese Patent Laid-Open No. 10-143328, a control method of preparing a plurality of operation modes in a storage device to which a plurality of HDDs are connected and performing data transfer by switching a transfer method by switching the operation mode has been proposed.

For example, according to PCT Japanese Translation Patent Publication No. 2011-515749, an SATA bridge controller that is connected to a main controller on a host side and functions as a port multiplier on a device side has been described. SATA bridges are connected in cascade to the bridge controller in several stages. With this configuration, a control method of extending functions of the port multiplier has been proposed.

The method of switching the function of the transfer method by switching the plurality of operation modes as described in Japanese Patent Laid-Open No. 10-143328 has been proposed. For example, in a case where both a mirroring function and a striping function are to be operated, three or more interface connection ports are to be used in the SATA bridge.

Furthermore, the number of circuits where the plurality of operation modes are performed at the same time is also increased. Thus, an issue that the control method performed by the SATA bridge becomes complicated and an issue that costs of a control circuit of the SATA bridge is increased occur.

On the other hand, as described in PCT Japanese Translation Patent Publication No. 2011-515749, the method of extending the function of the port multiplier by connecting the SATA bridges in cascade has been proposed, but a method on how the respective SATA bridges switch the plurality of operations has not been described.

SUMMARY OF THE INVENTION

One aspect of the embodiments has been made in view of at least one of the above-described issues.

One aspect of the embodiments aims at providing a storage system in which a plurality of functions of the storage system can appropriately function without complicating a control circuit, a control method for the storage system, and a program.

As an aspect of the present exemplary embodiments, a storage system includes a storage controller sets storage device operation modes. The operation modes include a mirroring mode and a hybrid mode. The mirroring mode causes a plurality of storage devices to perform a mirroring operation. The hybrid mode respectively causes a plurality of storage devices to operate without performing the mirroring operation. One connection unit among a plurality of connection units included in the storage controller is connected to one bus bridge. The bus bridge is further connected to the plurality of storage devices set in one predetermined operation mode by the storage controller. The storage controller sets an operation mode different from the predetermined operation mode of the storage device with respect to the storage device that is directly connected or connected via another bus bridge different from the bus bridge to another connection unit among the plurality of connection units.

Further features of the disclosure will become apparent from the following description of exemplary embodiments with reference to the attached drawings.

BRIEF DESCRIPTION OF THE DRAWINGS

FIG. 7A illustrates examples of operation modes that can be set with respect to the bridges according to the exemplary embodiment, and FIG. 7B illustrates operation mode allocation examples of the bridges according to the exemplary embodiment.

DESCRIPTION OF THE EMBODIMENTS

Hereinafter, exemplary embodiments of the disclosure will be described with reference to the drawings.

Exemplary Embodiments

First Exemplary Embodiment

Figure 1:
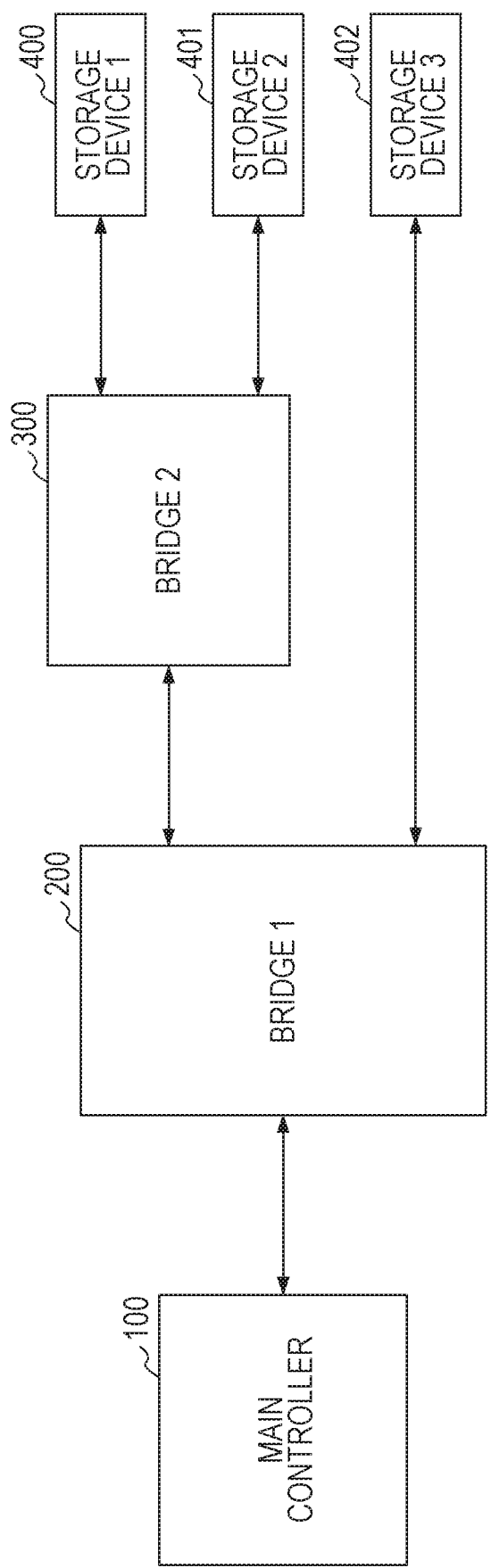
FIG. 1 is an overall block diagram according to a first configuration example of the embodiments.

FIG. 1 is a block diagram of an entire information processing apparatus according to a first configuration example of the disclosure. According to the present exemplary embodiment, a system configuration of an MFP will be described as an example of the information processing apparatus. The exemplary embodiment is not limited to this configuration, and the exemplary embodiment can be applied to an information processing apparatus having a configuration in which a plurality of storage devices are included.

The information processing apparatus according to the exemplary embodiment is constituted by including a main controller 100 that controls the entirety of the MFP, storage devices 400, 401, and 402 that store data, and bridges 200 and 300 that transmit and receive data with respect to the storage devices.

According to the present exemplary embodiment, descriptions will be provided while the storage devices 400 and 401 are set as an HDD and the storage device 402 is set as an SSD, but the configuration is not limited to this.

According to the present exemplary embodiment, the storage devices 400 and 401 store data that does not demand a high access speed. On the other hand, the storage device 402 stores data that demands a high access speed.

The present system includes two ports of SATA device interfaces (I/Fs) and is provided with an HDD encryption function. An operation can be performed in the following two operation modes.

In a mirroring mode, a mode in which the same data is written into two hard discs (so-called RAID1) is executed. A hybrid mode is a new function developed for a high speed MFP. For example, the connected high speed small capacity storage device 402 and low speed large capacity devices, such as HDDs, 400 and 401 are used. The mirroring mode is an operation mode in which these storage devices are presented as if the storage devices are a single high speed large capacity storage device from a viewpoint of the host, and issues in terms of the speed and the capacity are solved.

The hybrid mode is a mode for writing data that demands the high speed access into the SSD and writing the other data into the HDD. The hybrid mode is a mode when the high speed MFP needs the high speed access. In the present system, these operation modes are configured to be exclusive, and these operation modes are not to be turned on at the same time.

Figure 2:
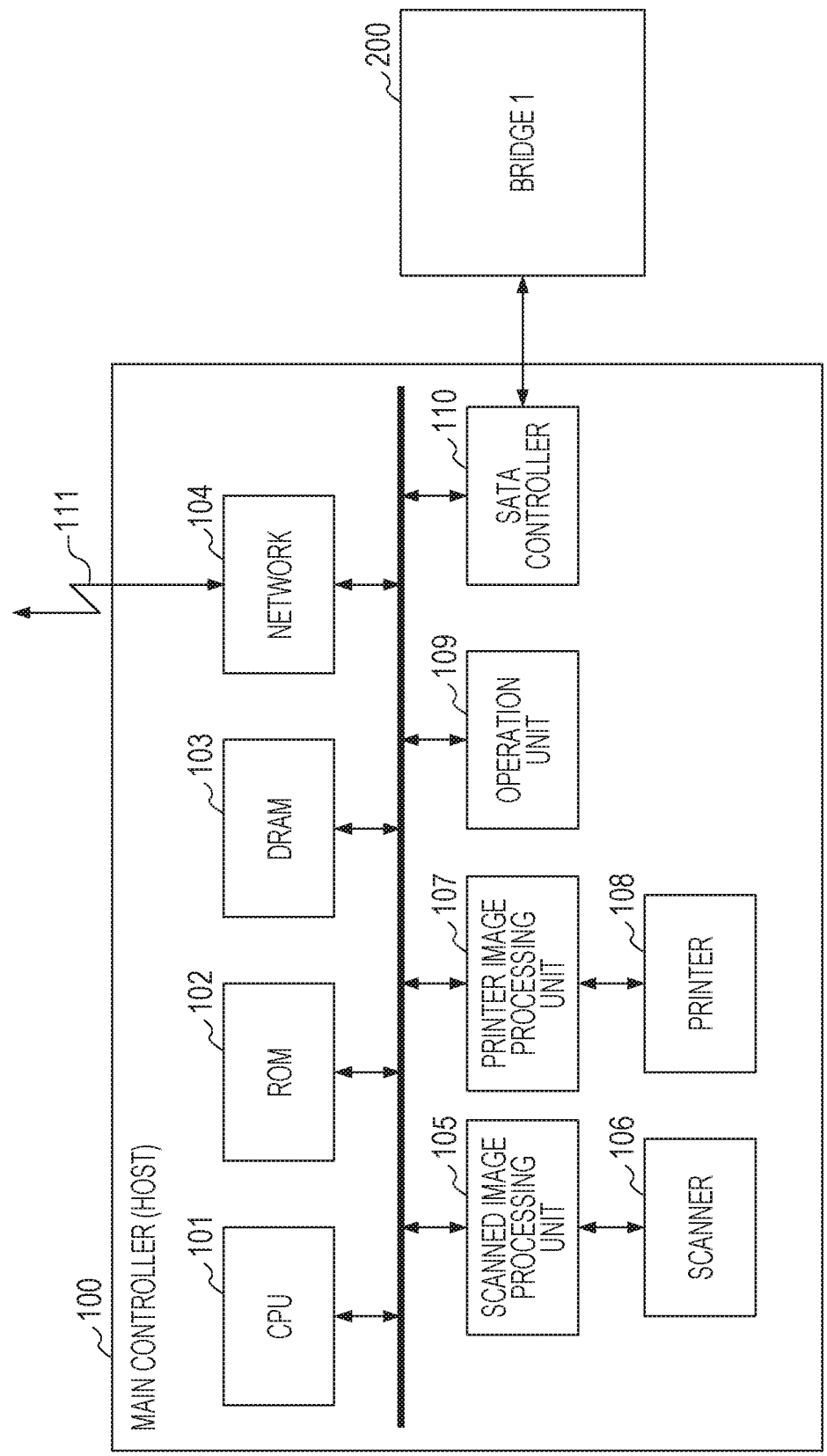
FIG. 2 illustrates a detailed configuration of a main controller according to an exemplary embodiment.

FIG. 2 illustrates a detailed configuration of the main controller 100. The main controller 100 is constituted by including a Central Processing Unit (CPU) 101, a Read-Only Memory (ROM) 102, a Dynamic Random Access Memory (DRAM) 103, a network 104, various image processing units (105 and 107), a scanner 106, a printer 108, an operation unit 109, and an SATA controller 110. The CPU 101 is a controller that controls the entirety of the system of the information processing apparatus and executes system control, calculation processing, an operating system (OS), and an application.

The ROM 102 is a read only memory and stores a program to be executed by the CPU 101 and setting information. The DRAM 103 stores a control program to be executed by the CPU 101. The DRAM 103 is also used as a temporary work area.

The network 104 is a network I/F and transmits the image data to which image processing has been applied in the information processing apparatus to an external information device (not illustrated) via a local area network (LAN) 111. Alternatively, the network 104 inputs the image data from the external information processing device.

The scanned image processing unit 105 applies image processing to the image data received from the scanner 106. The processed image data is saved in one of storage devices 400, 401, 402, and 403 via the SATA controller 110.

The scanner 106 is an image input device and irradiates an image on a sheet serving as an original and scans a charge coupled device (CCD) line sensor (not illustrated) to be converted into an electric signal as raster image data. The printer image processing unit 107 applies image processing to the received image data. The processed image data is transmitted to the printer 108.

The printer 108 is an image output device and converts the raster image data into the image on the sheet. The operation unit 109 is a device such as a touch panel having both a display function and an operation function and plays a role for displaying the image data and a role for transmitting information input by a system user to the CPU 101.

The SATA controller 110 controls connected devices in conformity to the SATA standard and performs data transmission and reception with respect to the bridge 200. The LAN 111 is a network for performing a communication between an image forming apparatus and the external information device.

Figure 3:
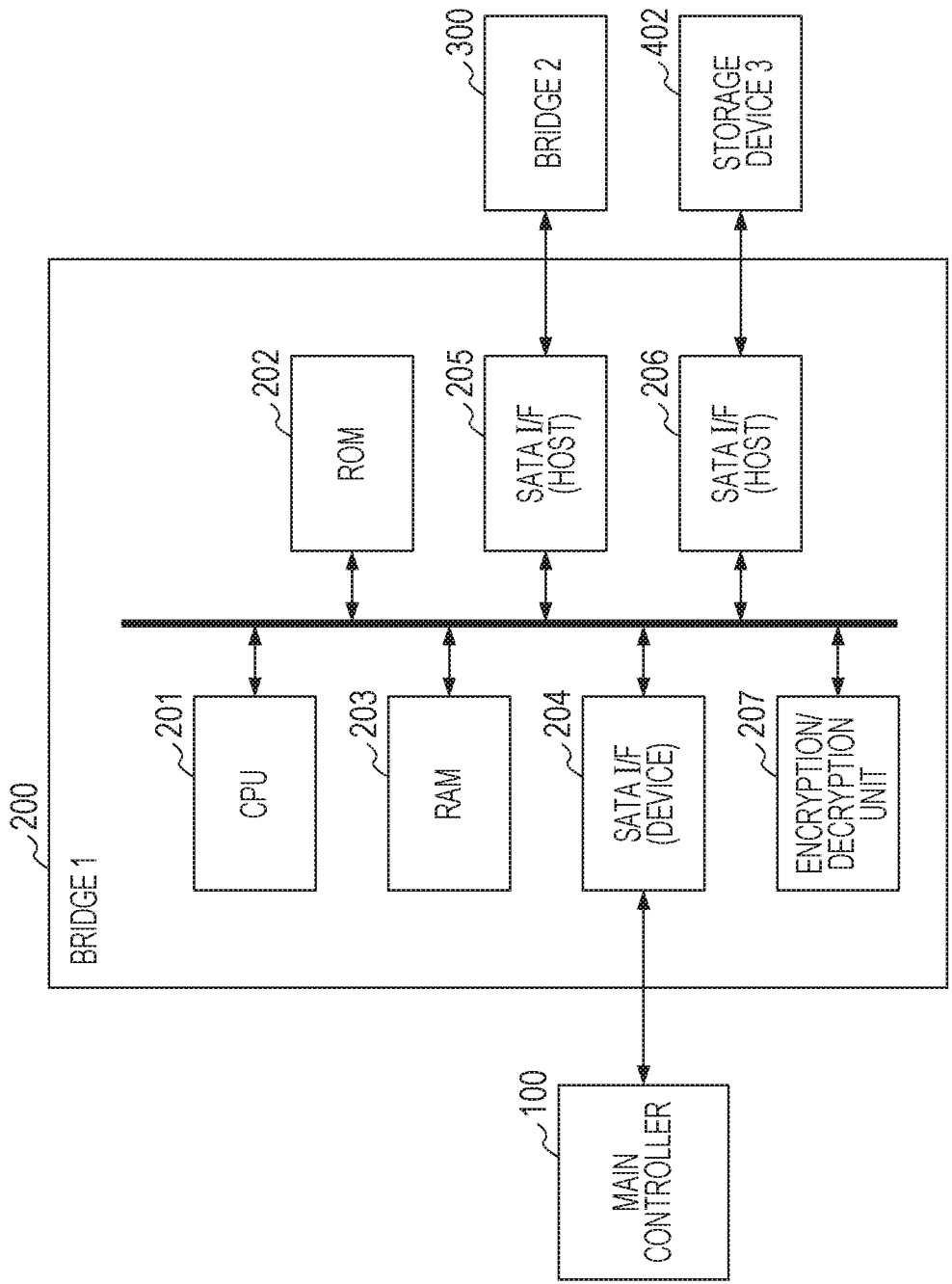
FIG. 3 illustrates a detailed configuration of a bridge according to an exemplary embodiment.

FIG. 3 illustrates a detailed configuration of the bridge 200. A CPU 201 performs the system control, the calculation processing, and ATA command processing of the bridge 200 and also performs transmission command processing to the storage devices 400, 401, and 402 and the bridge 300, or the like. A ROM 202 stores a control program of the CPU 201 and data of setting values of various modes.

A RAM 203 stores the control program to be executed by the CPU 201. The RAM 203 is also used as a temporary work area. An SATA device I/F 204 is connected to the main controller 100 and communicates with the SATA controller 110 in the main controller 100 in conformity to the SATA standard. SATA hosts I/Fs 205 and 206 are connected to the bridge 300 and the storage device 402 and respectively perform communications with the bridge 300 and the storage device 402 in conformity to the SATA standard. An encryption/decryption unit 207 performs encryption or decryption processing with respect to the reception data from the SATA device I/F 204 or the SATA host I/Fs 205 and 206 in response to an instruction from the CPU 201.

Figure 4:
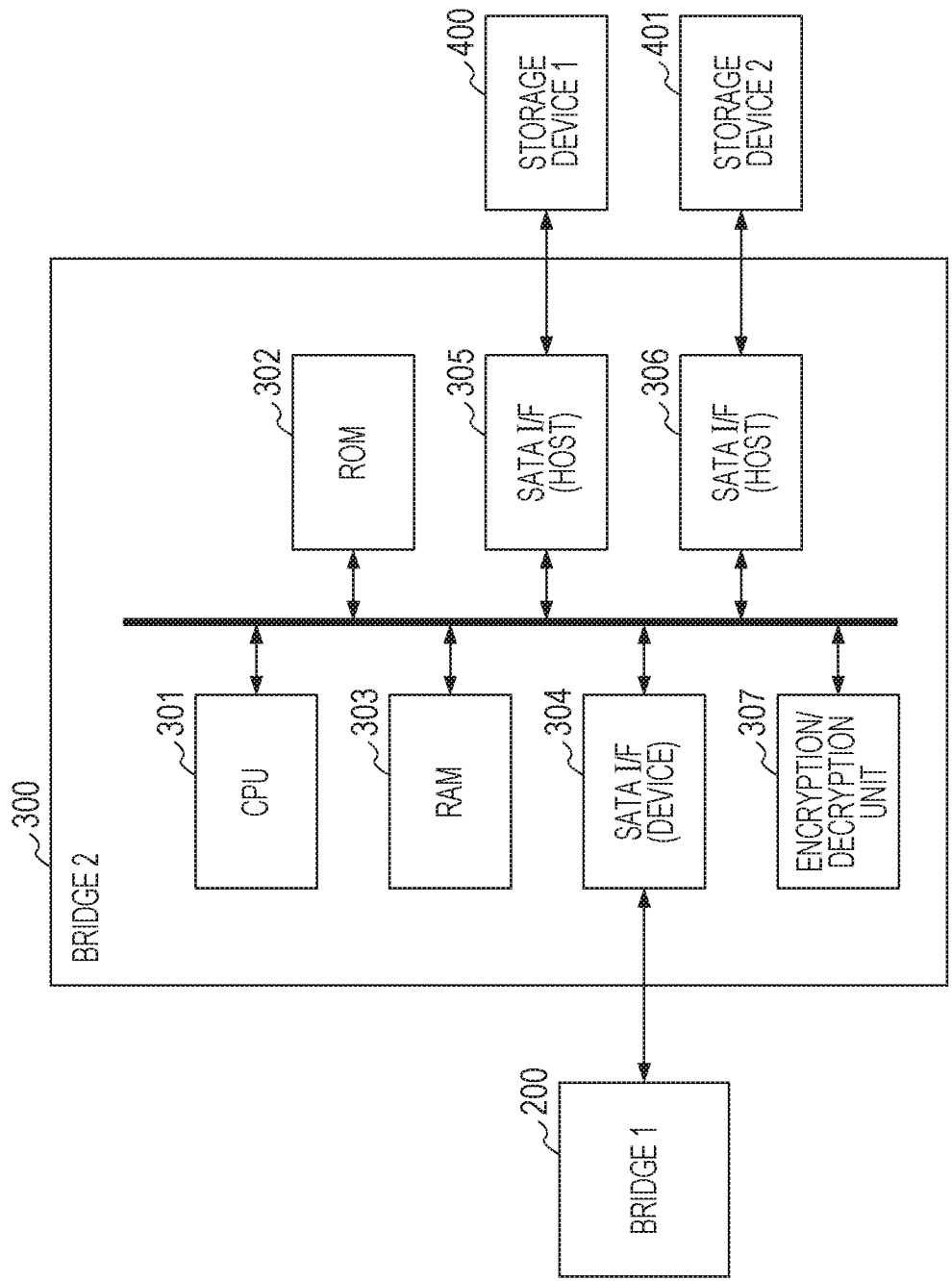
FIG. 4 illustrates a detailed configuration of another bridge according to an exemplary embodiment.

FIG. 4 illustrates a detailed configuration of the bridge 300.

A CPU 301 of the bridge 300 performs the system control, the calculation processing, and the ATA command processing and also performs the transmission command processing to the storage device 400 and the storage device 401.

A ROM 302 stores a control program of the CPU 301 and data of setting values in various modes. A RAM 303 stores the control program to be executed by the CPU 301. The RAM 303 is also used as a temporary work area.

An SATA device I/F 304 is connected to the bridge 200 and communicates with the SATA host I/F 205 in the bridge 200 in conformity to the SATA standard.

SATA host I/Fs 305 and 306 are connected to the storage devices 400 and 401 and communicate with the storage devices 400 and 401 in conformity to the SATA standard. An encryption/decryption unit 307 performs encryption or decryption processing with respect to the reception data from the SATA device I/F 304 or the SATA host I/Fs 305 and 306 in response to an instruction from the CPU 301.

Second Exemplary Embodiment

Figure 8:
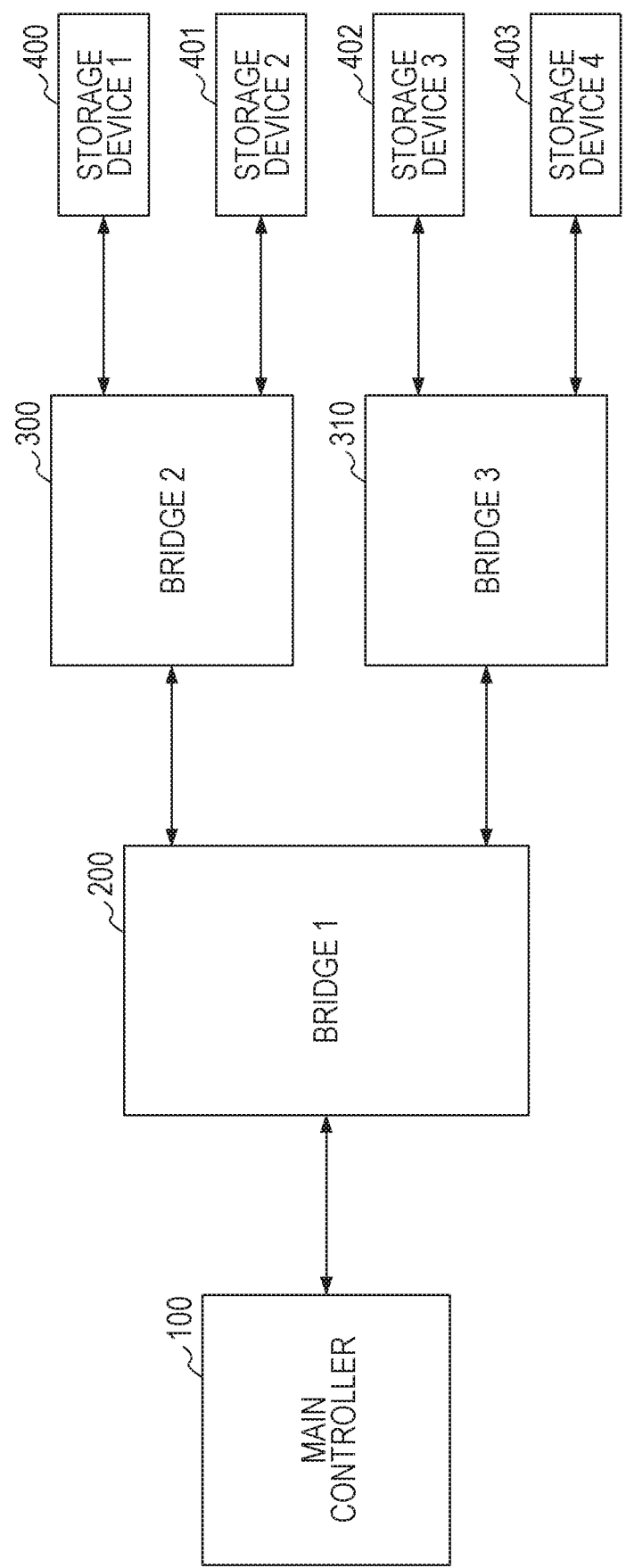
FIG. 8 is an overall block diagram according to a second configuration example.

FIG. 8 is a block diagram of an entire information processing apparatus according to a second configuration example of the disclosure. A difference from the first configuration example of FIG. 1 resides in a configuration in which the bridge 300 and the bridge 310 are connected to the bridge 200, and the storage devices 402 and 403 are further connected to the bridge 310.

Figure 9:
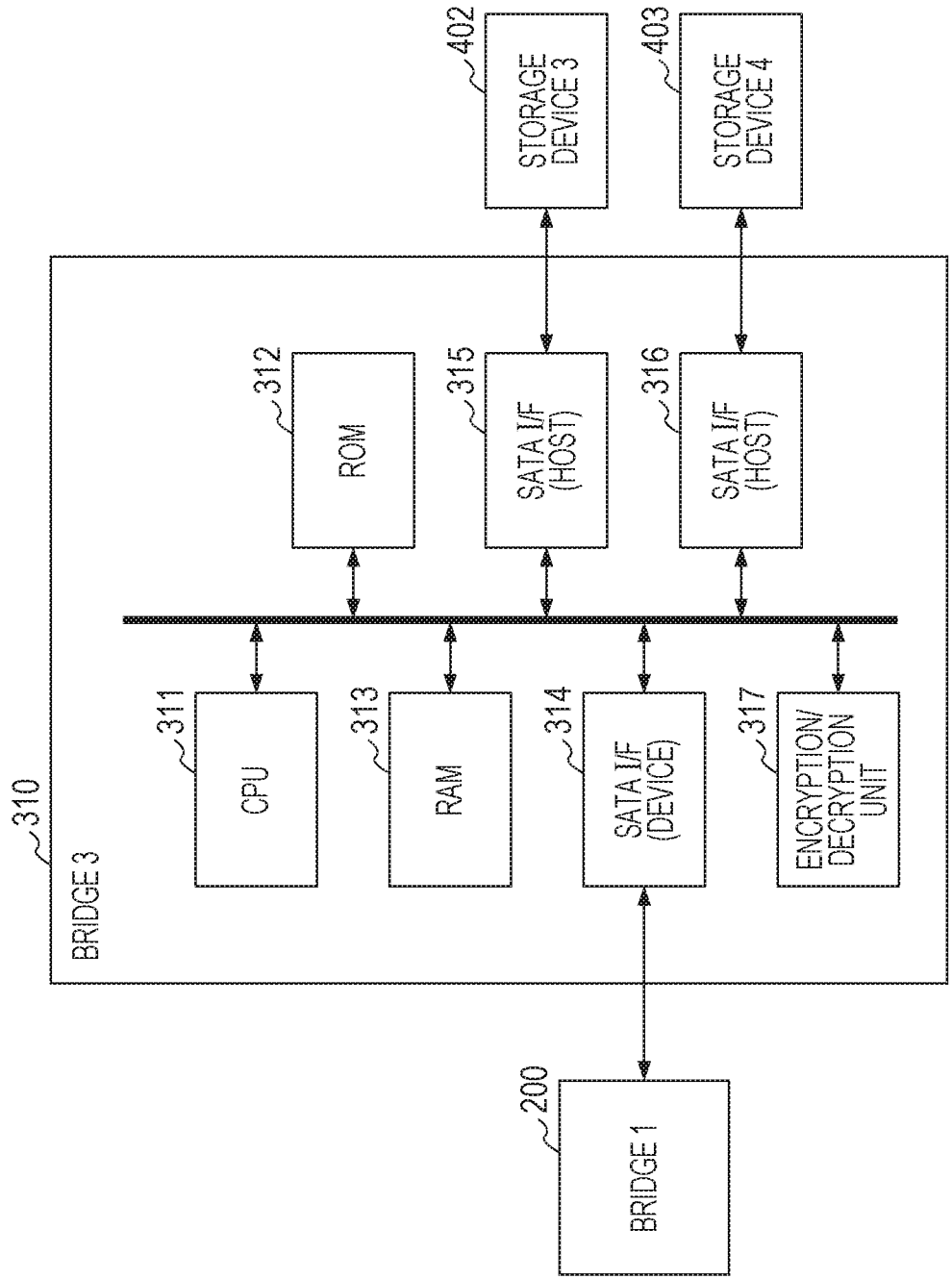
FIG. 9 illustrates a detailed configuration of the bridge according to the second configuration example.

In this manner, the disclosure is not intended to limit the number of bridges, further bridges that are not illustrated in the drawing may also be connected to the bridges 300 and 310 in accordance with the function to be operated and the number of connected storage devices. FIG. 9 illustrates a detailed configuration of the bridge 310.

A CPU 311 of the bridge 310 performs the system control, the calculation processing, and the ATA command processing and also performs the transmission command processing to the storage device 402 and the storage device 403.

A ROM 312 stores a control program of the CPU 311 and data of setting values in various modes. A RAM 313 stores the control program to be executed by the CPU 311. The RAM 313 is also used as a temporary work area.

An SATA device I/F 314 is connected to the bridge 200 and communicates with the SATA host I/F 206 in the bridge 200 in conformity to the SATA standard.

SATA host I/Fs 315 and 316 are connected to the storage devices 402 and 403 and communicate with the storage devices 402 and 403 in conformity to the SATA standard.

An encryption/decryption unit 317 performs encryption or decryption processing with respect to the reception data from the SATA device I/F 314 or the SATA host I/Fs 315 and 316 in response to an instruction from the CPU 311.

According to the present exemplary embodiment, the bridge 200, the bridge 300, and the bridge 310 are described as the same configuration, but the exemplary embodiment is not limited to the same configuration. Any function may be added or deleted of course within the scope for attaining the aim of the disclosure.

In addition, according to the present exemplary embodiment, the bridges 200, 300, and 310 are described as SATA bridges connected via the SATA interfaces, but the configuration is not limited to this. Other interfaces such as Peripheral Component Interconnect Express (PCIe) may also be used.

Furthermore, according to the present exemplary embodiment, the SATA controller 110, the bridge 200, the bridge 300, and the bridge 310 are described as separate chips. However, the exemplary embodiment is not limited to these, and some of the SATA controller 110 and the bridges 200, 300, and 310 may be included in the same chip.

Figure 5:
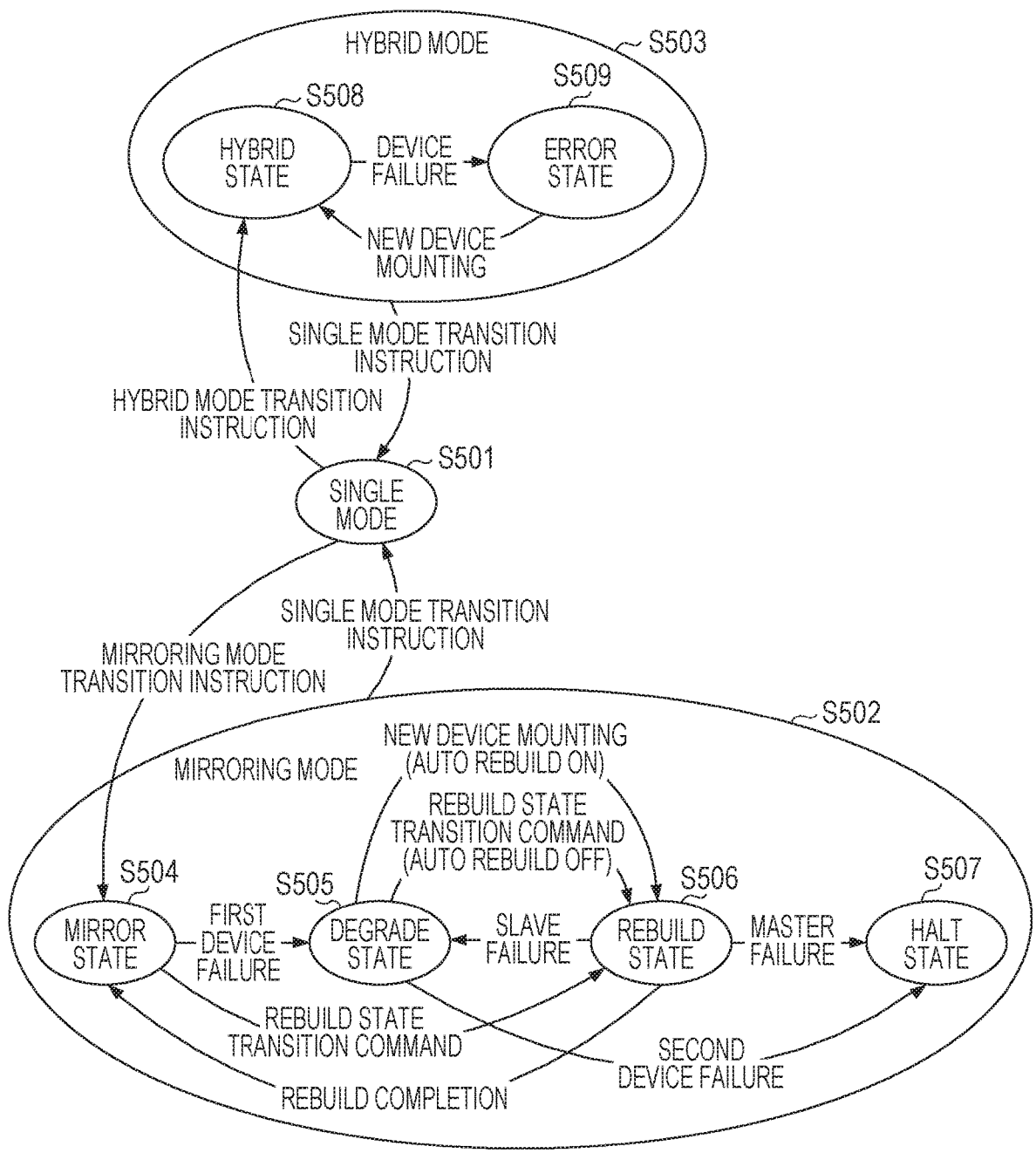
FIG. 5 illustrates state transition of operation modes of bridges according to an exemplary embodiment.

FIG. 5 illustrates state transitions of the bridges 200, 300, and 310 according to the first exemplary embodiment. Operations of the bridges 200, 300, and 310 will be described with reference to FIG. 5. Here, the operation will be described with reference to the block diagram of the bridge 300 as a representative. In addition, the HDD is used as an example of the storage devices 400 and 401 for the descriptions.

The bridges 200, 300, and 310 have three operation modes including a single mode (S501), a mirroring mode (S502), and a hybrid mode (S503).

The single mode (S501) is an operating mode in a state in which the HDD is connected to a single SATA host I/F. While the bridge 300 is used as an example, the single mode (S501) is an operating mode in a state in which the HDD is connected to only one of the SATA host I/F 305 and the SATA host I/F 306.

In the single mode (S501), when a transition command to the mirroring mode (S502) is issued from the host side through the SATA device I/F 304, the CPU 301 shifts to a mirror state (S504).

In addition, in the single mode (S501), a transition command to the hybrid mode (S503) is issued from the host side through the SATA device I/F 304, the CPU 301 shifts to a hybrid state (S508).

The CPU 301 stores the transition state in the ROM 302 when the transition is made to each state.

The single mode (S501) is a default operation mode. In a case where the mode at the time of the previous operation is not stored in the ROM 302 upon activation, the CPU 301 starts the operation in the single mode (S501).

On the other hand, in a case where the mode at the time of the previous operation is stored in the ROM 302 upon activation, the CPU 301 starts the operation in the stored operation mode.

The mirroring mode (S502) is an operating mode in a state in which the HDDs are mounted to the two SATA host I/Fs 305 and 306.

In the mirroring mode (S502), four states including a mirror state (S504), a degrade state (S505), a rebuild state (S506), and a halt state (S507) exist.

In the mirroring mode (S502), the CPU 301 treats one of the two SATA host I/Fs 305 and 306 as a master HDD and the other one as a slave HDD.

The mirror state (S504) is a state in which the operation is normally performed while the HDDs are mounted to the two SATA host I/Fs 305 and 306.

In the mirror state (S504), the CPU 301 performs data readout with respect to only the master HDD among the two SATA host I/Fs 305 and 306 in response to a data readout command notified from the host side via the SATA device I/F 304.

In the mirror state (S504), the CPU 301 performs data write with respect to both the master HDD and the slave HDD among the two SATA host I/Fs 305 and 306 in response to a data write command notified from the host side via the SATA device I/F 304.

In the mirror state (S504), when one HDD among the master HDD and the slave HDD fails, the state shifts to the degrade state (S505).

In the mirror state (S504), when a transition command to the rebuild state (S506) is issued from the host side via the SATA device I/F 304, the CPU 301 shifts to the rebuild state (S506).

The degrade state (S505) is a state in which only a normal device (for example, the HDD that has not failed) connected to one SATA host I/F operates. Furthermore, the degrade state (S505) is a state in which an abnormal device (for example, the HDD that has failed) is detected in the other SATA host I/F, and an access is not generated.

In the degrade state (S505), when a connection of a new normal HDD is detected as a substitute of the failing HDD, the CPU 301 shifts to the rebuild state (S506).

In the degrade state (S505), when it is detected that the abnormal devices are connected to both the two SATA host I/Fs 305 and 306 (the second HDD has also failed), the CPU 301 shifts to the halt state (S507).

The rebuild state (S506) is a state in which only the one HDD (the HDD that has been previously mounted and has not failed) operates, but data is copied (rebuilt) from the HDD to the other one HDD (the newly mounted HDD as a substitute of the failing HDD).

At this time, the CPU 301 treats the HDD at the copy source (the HDD that has been previously mounted and has not failed) as the master HDD and treats the HDD at the copy destination (the newly mounted HDD as a substitute of the failing HDD) as the slave HDD.

In the rebuild state (S506), when rebuilding is completed, the state shifts to the mirror state (S504). In the rebuild state (S506), when the slave HDD fails, the state shifts to the degrade state (S505). In the rebuild state (S506), when the master HDD fails, the state shifts to the halt state (S507).

The halt state (S507) is a state in which both the HDDs are put into the abnormal state, and the mirroring operation is not continued.

Herein, the HDDs are represented as the examples of the devices connected to the SATA host I/Fs 305 and 306, the SSD or the SATA bridge may also be used.

In a case where the devices connected to the SATA host I/Fs 305 and 306 are the SSDs, the CPU 301 determines that the abnormal device is connected when the SSD itself fails similarly as in the HDD.

In a case where the devices connected to the SATA host I/Fs 305 and 306 are the SATA bridges, the CPU 301 determines that the abnormal device is connected when the SATA bridge notifies of being in the abnormal state.

The hybrid mode (S503) is a mode in which the operation is performed in a state in which the HDD and the SSD are mounted to the two SATA host I/Fs 305 and 306.

In the hybrid mode (S503), two states including a hybrid state (S508) and an error state (S509) exist.

In the hybrid mode (S502), the CPU 301 performs an address integration with respect to the HDD and the SSD connected to the two SATA host I/Fs 305 and 306 and operates as a single storage device from the viewpoint of the host side through the SATA device I/F 304.

The hybrid state (S508) is a state in which the operation is normally performed in a state in which the HDD and the SSD are mounted to the two SATA host I/Fs 305 and 306.

In the hybrid state (S508), when one of the HDD and the SSD fails, the CPU 301 shifts to the error state (S509).

The error state (S509) is a state in which the hybrid operation is not continued when one of the HDD and the SSD is put into the abnormal state.

An operation of initialization processing of the device connected to the SATA controller 110 which is executed by the CPU 101 in the main controller 100 will be described with reference to the flow chart of FIG. 6A.

Figure 6A:
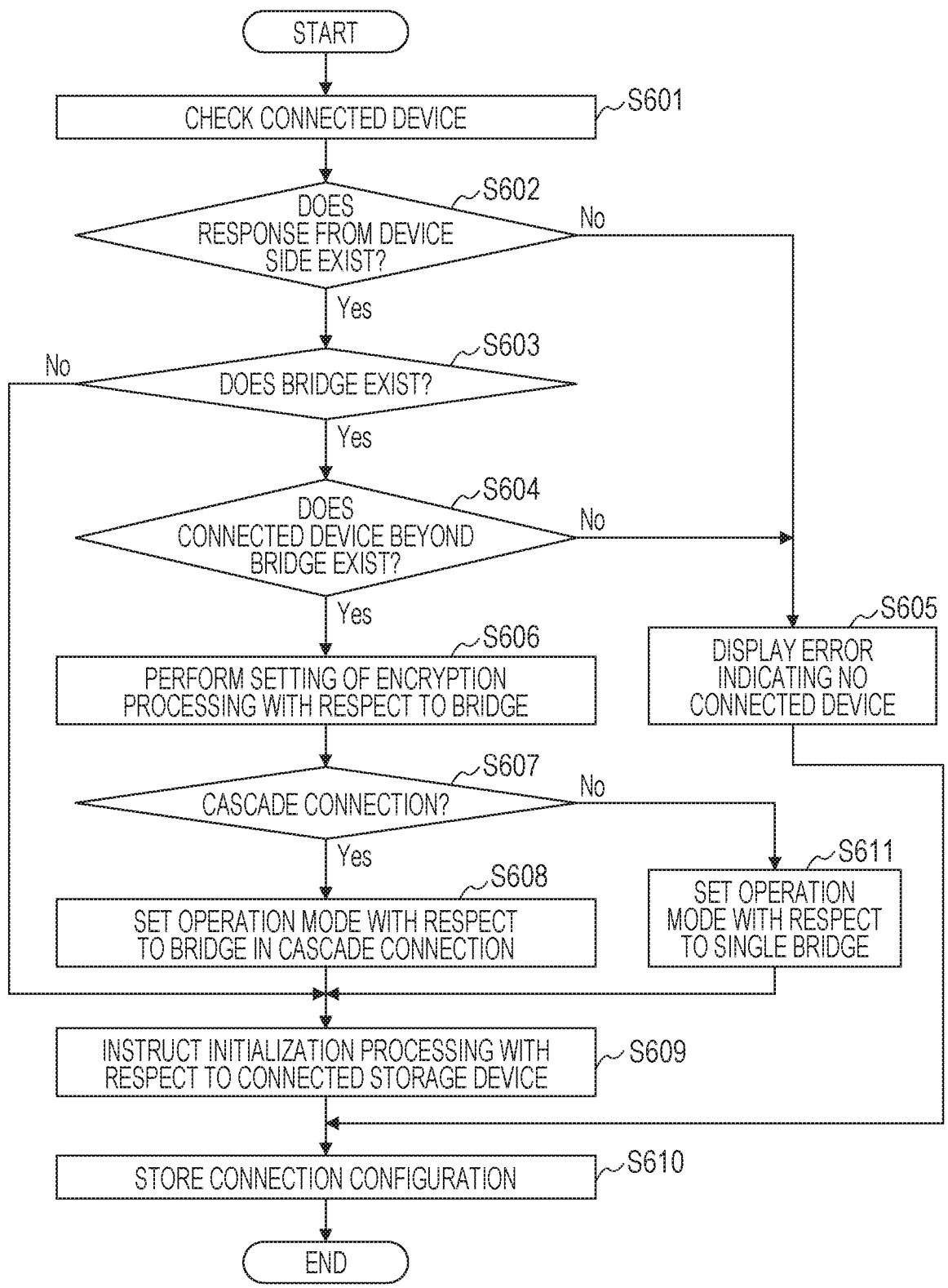
FIG. 6A is a flow chart at the time of an operation mode setting performed by the main controller according to the exemplary embodiment.

An operation flow of FIG. 6A is a program operating on the CPU 101. This is stored in the DRAM 103, the ROM 102, or the storage devices 400, 401, 402, and 403.

FIG. 6A is preferably executed at the time of initialization such as activation. However, the configuration is not limited to this, and the operation flow may also be executed when the connected SATA device is accessed.

In S601, the CPU 101 checks whether or not the SATA device is connected via the SATA controller 110. As a specific example, an ATA command such as an IDENTIFY DEVICE command is issued to check whether or not the SATA device is connected.

In a case where a response is made to the IDENTIFY DEVICE command issued in S601, the CPU 101 determines that the SATA device is connected to the SATA controller 110 (S602: Yes) and proceeds to S603.

In a case where no response is made to the IDENTIFY DEVICE command issued in S601, the CPU 101 determines that the SATA device is not connected to the SATA controller 110 (S602: No) and proceeds to S605.

In S603, the CPU 101 determines, on the basis of the response contents to the IDENTIFY DEVICE command issued in S601, whether or not the SATA bridge is connected to the SATA controller 110.

In S603, in a case where the CPU 101 determines that the SATA bridge is connected to the SATA controller 110 (S603: Yes), the flow proceeds to S604.

In S603, in a case where the CPU 101 determines that the storage device is connected to the SATA controller 110 (S603: No), the flow proceeds to S609.

In S604, the CPU 101 determines, on the basis of the response contents to the IDENTIFY DEVICE command issued in S601, whether or not the connection device connected to the SATA controller 110 is further connected to a part beyond the SATA bridge 200.

In S604, in a case where the CPU 101 determines that the connection device is further connected to a part beyond the SATA bridge 200 (S604: Yes), the flow proceeds to S606.

In S604, in a case where the CPU 101 determines that the connection device is not further connected to a part beyond the SATA bridge 200 (S604: No), the flow proceeds to S605.

In S605, the CPU 101 performs an error display with respect to the operation unit 109 indicating that the storage device connected to the SATA controller 110 is not detected.

In S606, the CPU 101 performs an instruction of encryption processing with respect to the SATA bridge 200 via the SATA controller 110.

In S607, the CPU 101 determines, on the basis of the response contents to the IDENTIFY DEVICE command issued in S601, whether or not the SATA bridge is connected in cascade to the SATA controller 110.

In S607, in a case where the CPU 101 determines that the SATA bridge 200 is connected in cascade to the SATA controller 110 (S607: Yes), the flow proceeds to S608.

In S607, in a case where the CPU 101 determines that the SATA bridge 200 is not connected in cascade to the SATA controller 110 (S607: No), the flow proceeds to S611.

In S611, the CPU 101 performs a setting of an operation mode with respect to the SATA bridge 200 via the SATA controller 110. At this time, the operation mode that can be set with respect to the SATA bridge 200 is either (i) the mirroring mode only S502 or (ii) the hybrid mode only S503.

In S608, the CPU 101 sets the operation modes of the SATA bridges 200, 300, and 310 via the SATA controller 110. At this time, the operation modes that can be set with respect to the SATA bridges 200, 300, and 310 are three types including (i) the mirroring mode only S502, (ii) the hybrid mode only S503, and (iii) both the mirroring mode S502 and the hybrid mode S503.

In S609, the CPU 101 performs the instruction of the initialization processing with respect to the storage devices 400, 401, 402, and 403 connected via the SATA controller 110 and the SATA bridges 200, 300, and 310.

In S610, the CPU 101 stores information of the device configuration connected beyond the SATA controller 110 or the setting information of the SATA bridges 200, 300, and 310 in the ROM 102 or the storage devices 400, 401, 402, and 403.

According to the present exemplary embodiment, the IDENTIFY DEVICE command is used as an example of a method of checking the connected device configuration.

However, the configuration is not limited to this, and any method may also be used as long as it is possible to check the presence or absence of the SATA device, the existence of the SATA bridge, and the cascade connection of the SATA bridge. Of course, the configuration is not limited to the ATA command, and a unique extended command may also be issued.

Next, a mode setting executed by the bridges 200, 300, and 310 and an operation of the initialization processing will be described with reference to a flow chart of FIG. 6B. Herein, the operation of the initialization processing executed by the CPU 201 in the bridge 200 is described as an example, but this operation flow can also be applied to the bridges 300 and 310.

Figure 6B:
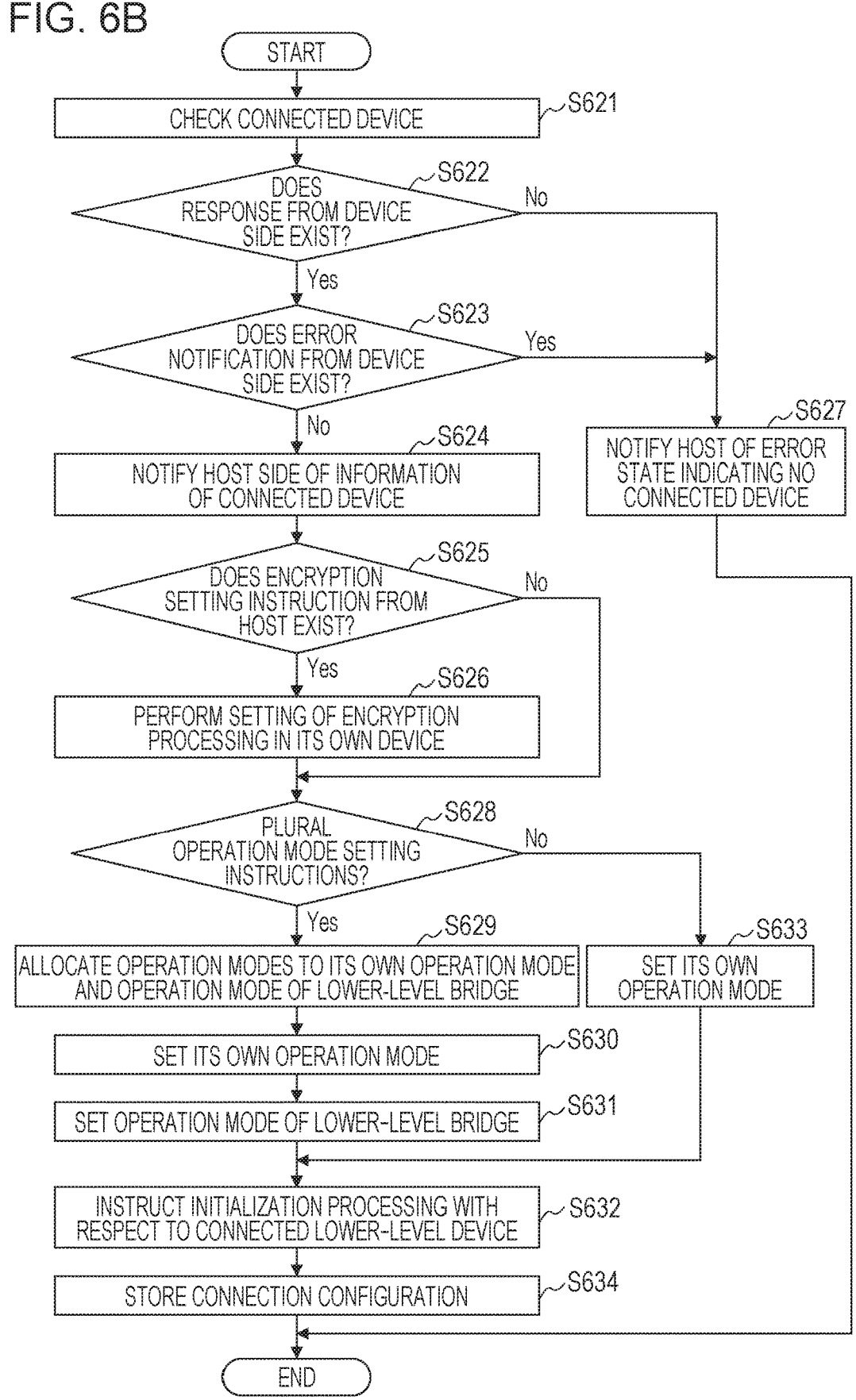
FIG. 6B is a flow chart at the time of an operation mode setting performed by the bridges according to the exemplary embodiment.

An operation flow of FIG. 6B is a program operating on the CPU 201 to be stored in the RAM 203, the ROM 202, or the storage devices 400, 401, 402, and 403.

FIG. 6B is preferably executed at the time of initialization such as activation. However, the configuration is not limited to this, and the operation flow may also be executed when the connected SATA device is accessed.

In S621, when a connection device confirmation from the host side is notified via the SATA device I/F 204, the CPU 201 checks whether or not the SATA devices beyond the SATA host I/Fs 205 and 206 are connected. As a specific example, the issuance of the ATA command such as the IDENTIFY DEVICE command is performed to check whether or not the SATA device is connected.

In a case where a response to the IDENTIFY DEVICE command issued in S621 exists, the CPU 201 determines that the SATA devices beyond the SATA host I/Fs 205 and 206 are connected (S622: Yes) and proceeds to S623.

In a case where the response to the IDENTIFY DEVICE command issued in S621 does not exist, the CPU 201 determines that the SATA devices are not connected to the SATA host I/Fs 205 and 206 (S622: No) and proceeds to S627.

In S623, the CPU 201 determines whether or not the response to the IDENTIFY DEVICE command issued in S621 includes contents for a notification of an error state in which the devices are not connected.

In S623, in a case where the CPU 201 determines that the response to the IDENTIFY DEVICE command issued in S621 includes the error notification contents (S623: Yes), the flow proceeds to S627.

In S623, in a case where the CPU 201 determines that the response to the IDENTIFY DEVICE command issued in S621 does not include the error notification contents (S623: No), the flow proceeds to S624.

In S624, the CPU 201 merges the response contents of the IDENTIFY DEVICE command to the SATA host I/Fs 205 and 206 issued in S621 and the information of the bridge 200 itself as connection device information. In S624, the CPU 201 further notifies the host side of the connection device information.

In S625, the CPU 201 determines whether or not a setting instruction of the encryption processing is issued from the host side via the SATA device I/F 204.

In S625, in a case where the CPU 201 determines that the setting instruction of the encryption processing is issued from the host side (S625: Yes), the processing advances to S626. In a case where the CPU 201 determines that the setting instruction of the encryption processing is not issued from the host side (S625: No), the processing advances to S628.

In S626, the CPU 201 performs the encryption/decryption setting processing in accordance with the instruction received in S625 from the host side via the SATA device I/F 204 and stores the setting contents in the ROM 202.

Subsequently, the following processing is performed on the data which has been received via the SATA device I/F 204 and which is to be written by the main controller 100 into the storage devices 400, 401, 402, and 403. The CPU 201 performs the encryption processing with respect to this data by using the setting contents stored in the ROM 202 and the encryption/decryption unit 207 to be transmitted to a lower-level device via the SATA host I/Fs 205 and 206.

Furthermore, the main controller 100 reads out the data from the storage devices 400, 401, 402, and 403 via the SATA host I/Fs 205 and 206. The CPU 201 performs the decryption processing with respect to this data by using the setting contents stored in the ROM 202 and the encryption/decryption unit 207 to be transmitted to an upper-level device via the SATA device I/F 204.

In S628, the CPU 201 receives a mode setting instruction from the host side via the SATA device I/F 204. Furthermore, in S628, the CPU 201 determines whether or not the received mode setting instruction from the host side corresponds to a plurality of operation mode setting instructions.

In S628, in a case where the CPU 201 determines that the received mode setting instruction from the host side corresponds to the plurality of operation mode setting instructions (S628: Yes), the processing advances to S629.

In S628, in a case where the CPU 201 determines that the received mode setting instruction from the host side does not correspond to the plurality of operation mode setting instructions (S628: No), the processing advances to S635.

In S629, the CPU 201 allocates the mode setting instructions received in S628 to the operation mode set with respect to its own device and the operation mode set with respect to the lower-level bridge device.

In S630, the CPU 201 performs its own operation mode setting in accordance with the mode setting of the bridge 200 itself allocated in S629.

In S631, the CPU 201 performs the operation mode setting of the lower-level bridge device via the SATA host I/Fs 205 and 206 in accordance with the mode setting to the lower-level bridge device allocated in S629.

In S632, the CPU 201 receives the initialization processing instruction from the host side to the storage device via the SATA device I/F 204. Furthermore, in S626, the CPU 201 notifies the devices connected to the SATA host I/Fs 205 and 206 of the received initialization processing instruction.

In S633, the CPU 201 performs its own operation mode setting in accordance with the mode setting of the bridge 200 itself received in S628 and advances the processing to S632.

In S634, the CPU 201 stores the operation mode of the bridge 200 itself set in S629 or S633 or the connection configuration of the connection device checked in S621 in the ROM 202.

In S627, the CPU 201 notifies the host side of the error state in which the devices are not connected to the SATA host I/Fs 205 and 206.

As described above, the mode setting of the bridge 200 and the initialization processing are ended.

Next, a pattern of an operation mode that can be set and instructed by the CPU 101 in S608 of FIG. 6A will be described in detail with reference to FIG. 7A.

FIG. 7A is a correspondence table of the cascade connection configuration pattern of the SATA bridges connected to the main controller 100 and the settable operation mode by the CPU 101 with respect to the lower-level bridge.

In S603 and S607, the CPU 101 determines whether or not the SATA bridge is connected to a lower-level device than the SATA controller 110 and determines whether or not the cascade connection is established. Herein, the cascade connection configuration of the SATA bridge connected to the lower-level device than the SATA controller 110 includes the following configurations. That is, the configurations are classified into "only the storage device" is connected, "the single SATA bridge" only is connected, and "two or more SATA bridges" are connected.

In a case where "only the storage device" is connected to the lower-level device than the SATA controller 110, since the SATA bridge does not exists, no settable mode exists.

In a case where "the single SATA bridge" only is connected to the lower-level device than the SATA controller 110, since only the single SATA bridge exists, the settable mode is either "the mirroring mode only (S502)" or "the hybrid mode only (S503)".

In a case where "two or more SATA bridges" are connected to the lower-level device than the SATA controller 110, the following state is established. The settable mode is "the mirroring mode only (S502)", "the hybrid mode only (S503)", or "both the mirroring mode (S502) and the hybrid mode (S503)".

Next, the allocation performed by the CPU 201 in S629 of FIG. 6B of the plurality of operation modes with respect to the lower-level bridges will be described with reference to FIG. 7B.

FIG. 7B is a correspondence table of the cascade connection configuration patterns of the devices connected to the SATA bridge 200 and the allocation patterns of the operation modes in which the CPU 201 allocates the plurality of operation modes with respect to the lower-level bridges.

In a case where the single storage device and the single SATA bridge are connected to the SATA host I/Fs 205 and 206 of the SATA bridge 200, the SATA bridge 200 itself and the SATA bridge 300 perform the mode setting. For this reason, the method of allocating the plurality of operation modes received from the host side via the SATA device I/F 204 is as follows. That is, the only one method pattern is adopted in which the hybrid mode S503 is allocated to its own device (the SATA bridge 200) and the mirroring mode S502 is allocated to the lower-level bridge device (the SATA bridge 300).

In a case where the two SATA bridges are connected to the SATA host I/Fs 205 and 206 of the SATA bridge 200, the SATA bridge 200 itself, the SATA bridge 300, and the SATA bridge 310 perform the mode setting.

For this reason, the method of allocating the plurality of operation modes received from the host side via the SATA device I/F 204 is as follows. The following method is the first pattern in which the hybrid mode is allocated to its own device (the SATA bridge 200) and the mirroring mode is allocated to the two lower-level bridge devices (the SATA bridges 300 and 310). The following method is the second pattern in which the mirroring mode S502 is allocated to its own device (the SATA bridge 200) and the hybrid mode S503 is allocated to the two lower-level bridge devices (the SATA bridges 300 and 310).

According to the embodiment as described above, the SATA bridges 200, 300, and 310 in cascade connection and the storage devices 400, 401, 402, and 403 connected beyond the SATA bridges are identified. Then, the allocation and the setting of the operation mode of each of the SATA bridges are performed in accordance with the connection configuration of the SATA bridge and the storage device. With this configuration, the plurality of functions can be functioned at the same time as the entirety of the storage system without complicating the control circuit of each of the SATA bridges.

The CPU 311 is an example of a storage controller. The storage devices 400, 401, 402, and 403 are examples of the plurality of storage devices. The CPU 311 has been disclosed which sets the operation modes of the storage devices including the mirroring mode for performing the mirroring operation of these devices and the hybrid mode for respectively operating the plurality of storage devices without performing the mirroring operation. One connection unit among the plurality of connection units included in the storage controller may be connected to a single bus bridge. The bus bridge may be further connected to the plurality of storage devices set by the storage controller. The storage device may be set in a predetermined operation mode (for example, mirroring or hybrid). The storage device that is directly connected or connected via another bus bridge to the other connection unit among a plurality of connection units (315 and 316) exists. In addition, the storage controller can set an operation mode different from the operation mode of the predetermined storage device.

The SATA host I/Fs 315 and 316 are examples of the connection units.

The CPU 311 performs the following setting on the basis of the connection configuration of the bridges 200, 300, and 310 and the storage devices 400, 401, 402, and 403. That is, the operation modes of the storage devices 400, 401, 402, and 403 included in the storage system are set. FIGS. 7A and 7B describe that the settings of the operation modes of the storage devices vary depending on the number of the storage devices, the number of SATA bridges, or the like. FIGS. 7A and 7B are examples of the connection configuration including how to connect these devices in cascade.

In a case where the predetermined storage device 400 or the like in the storage system is set to perform the encryption operation, it is also possible to control in a manner that the storage device connected to the downstream side with respect to the storage device 400 does not perform the encryption operation. For example, the above-described configuration is described with reference to FIG. 7B. The storage devices 400, 401, 402, and 403 stored with respect to the other connection unit can be replaced with other bridges.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (an application specific integrated circuit (ASIC))) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-213822 filed Nov. 6, 2017, which is hereby incorporated by reference herein in its entirety.

What is claimed is:

1. A storage system comprising:
a storage controller that includes a setting unit configured to set storage device operation modes including a first mode and a second mode, the first mode being a mode of writing same data into a plurality of storage devices, the second mode being a mode of controlling a plurality of storage devices as a single storage device;
wherein the storage controller is connected to a first bus bridge,
wherein the first bus bridge is connected to a second bus bridge, and is connected to a third bus bridge or a storage device,
wherein the second bus bridge is connected to a plurality of storage devices,
wherein the first bus bridge operates in the second mode, and
wherein the second bus bridge operates in the first mode.

2. The storage system according to claim 1, wherein the storage controller sets the operation modes of the storage devices included in the storage system on a basis of a connection configuration of the first bus bridge.

3. The storage system according to claim 1, wherein, in a case where a predetermined storage device in the storage system is set to perform an encryption operation, a control is performed in a manner that the storage device connected on a downstream side with respect to the storage device does not perform the encryption operation.

4. The storage system according to claim 1,
wherein the first bus bridge is connected to the second bus bridge, and is connected to the storage device without being connected to the third bus bridge.

5. The storage system according to claim 1,
wherein the storage device connected to the first bus bridge is a nonvolatile semiconductor storage device, and
wherein each of the plurality of storage devices connected to the second bus bridge is a nonvolatile magnetic storage device.

6. The storage system according to claim 5,
wherein data for which high-speed access is necessary is stored in the nonvolatile semiconductor storage device, and
wherein data for which high-speed access is unnecessary is stored in the nonvolatile magnetic storage device.

7. The storage system according to claim 1,
wherein the first bus bridge is connected to the second bus bridge, is connected to the third bus bridge, and is not connected to the storage device, and
wherein the third bus bridge is connected to a plurality of storage devices different from the plurality of storage devices.

8. The control method according to claim 5,
wherein data for which high-speed access is necessary is stored in the nonvolatile semiconductor storage device, and
wherein data for which high-speed access is unnecessary is stored in the nonvolatile magnetic storage device.

9. The storage system according to claim 1, wherein the first bus bridge and the second bus bridge are SATA bridges.

10. A control method for a storage system,
the storage system including a storage controller, the storage controlling including a setting unit configured to set storage device operation modes the storage device operation modes including a first mode and a second mode, the first mode being a mode of writing same data into a plurality of storage devices, the second mode being a mode of controlling a plurality of storage devices as a single storage device,
wherein the storage controller is connected to a first bus bridge,
wherein the first bus bridge is connected to a second bus bridge, and is connected to a third bus bridge or a storage device,
wherein the second bus bridge is connected to a plurality of storage devices,
the control method comprising:
a first operation step in which the first bus bridge operates in the second mode; and
a second operation step in which the second bus bridge operates in the first mode.

11. The control method according to claim 10, wherein the storage controller sets the operation modes of the storage devices included in the storage system on a basis of a connection configuration of the first bus bridge.

12. The control method according to claim 10, wherein, in a case where a predetermined storage device in the storage system is set to perform an encryption operation, a control is performed in a manner that the storage device connected on a downstream side with respect to the storage device does not perform the encryption operation.

13. The control method according to claim 10,
wherein the first bus bridge is connected to the second bus bridge, and is connected to the storage device without being connected to the third bus bridge.

14. The control method according to claim 10,
wherein the storage device connected to the first bus bridge is a nonvolatile semiconductor storage device, and
wherein each of the plurality of storage devices connected to the second bus bridge is a nonvolatile magnetic storage device.

15. The control method according to claim 10,
wherein the first bus bridge is connected to the second bus bridge, is connected to the third bus bridge, and is not connected to the storage device, and
wherein the third bus bridge is connected to a plurality of storage devices different from the plurality of storage devices.

16. A storage system comprising:
a storage controller;
wherein the storage controller is connected to a first bus bridge,
wherein the first bus bridge is connected to a second bus bridge, and is connected to a third bus bridge or a storage device,
wherein the second bus bridge is connected to a plurality of storage devices,
wherein the first bus bridge is set to a first mode, in which different data is written in each of a plurality of storage devices, and operates in the first mode, and
wherein the second bus bridge is set to a second mode, in which same data is written in each of a plurality of storage devices, and operates in the second mode.

17. The storage system according to claim 16, wherein the first bus bridge is configured to connect the second bus bridge and the storage device.

18. The storage system according to claim 16,
wherein the storage device is a non-volatile semiconductor storage device, and wherein the plurality of storage devices are non-volatile magnetic storage devices.

19. The storage system according to claim 16, wherein the first bus bridge and the second bus bridge are SATA bridges.

* * * * *